(12) United States Patent
Luo et al.

(10) Patent No.: US 12,052,084 B2
(45) Date of Patent: Jul. 30, 2024

(54) VIRTUAL BEAM SWEEPING FOR A PHYSICAL RANDOM ACCESS CHANNEL IN NEW RADIO AND LONG TERM EVOLUTION ACTIVE ANTENNA SYSTEMS

(71) Applicant: Telefonaktiebolaget LM Ericsson (publ), Stockholm (SE)

(72) Inventors: Kevin Luo, Nepean (CA); Mercy George, Kanata (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 406 days.

(21) Appl. No.: 17/437,599

(22) PCT Filed: Apr. 18, 2019

(86) PCT No.: PCT/IB2019/053232
§ 371 (c)(1),
(2) Date: Sep. 9, 2021

(87) PCT Pub. No.: WO2020/212739
PCT Pub. Date: Oct. 22, 2020

(65) Prior Publication Data
US 2022/0149928 A1 May 12, 2022

(51) Int. Cl.
*H04B 7/08* (2006.01)
*H04W 72/044* (2023.01)
*H01Q 3/36* (2006.01)

(52) U.S. Cl.
CPC ........ *H04B 7/0874* (2013.01); *H04W 72/044* (2013.01); *H01Q 3/36* (2013.01)

(58) Field of Classification Search
None
See application file for complete search history.

(56) References Cited

U.S. PATENT DOCUMENTS

| | | | | |
|---|---|---|---|---|
| 8,897,254 | B2 * | 11/2014 | Koivisto | H04B 7/065 |
| | | | | 455/562.1 |
| 10,686,504 | B2 * | 6/2020 | Li | H04W 72/21 |
| 11,240,809 | B2 * | 2/2022 | Tsai | H04W 56/0015 |
| 2010/0311860 | A1 * | 12/2010 | Berthelot | C08F 259/08 |
| | | | | 522/144 |

(Continued)

OTHER PUBLICATIONS

International Search Report and Written Opinion dated Nov. 25, 2019 issued in PCT Application No. PCT/IB2019/053232, consisting of 12 pages.

*Primary Examiner* — Faiyazkhan Ghafoerkhan
(74) *Attorney, Agent, or Firm* — Weisberg I.P. Law, P.A.

(57) ABSTRACT

A method and network node for virtual beam sweeping of signals received by antennas of the network node are provided. According to one aspect, a method includes determining elements of a beam forming matrix W. The method further includes determining elements of a virtual beam sweeping matrix V, the elements of the virtual beam sweeping matrix V being determined to form beams between beams formed by the beam forming matrix W. The method also includes applying the matrices V and W to uplink signals $S_a$ received by antennas of the network node to produce received signals $S_b$ in a beam space.

18 Claims, 8 Drawing Sheets

(56) References Cited

U.S. PATENT DOCUMENTS

| | | | |
|---|---|---|---|
| 2011/0103504 A1* | 5/2011 | Ma | H04B 7/063 |
| | | | 375/267 |
| 2013/0321207 A1* | 12/2013 | Monogioudis | H01Q 3/40 |
| | | | 342/373 |
| 2018/0131425 A1* | 5/2018 | Li | H04B 7/0626 |
| 2018/0242231 A1* | 8/2018 | Reial | H04L 1/0054 |
| 2019/0090227 A1* | 3/2019 | Tsai | H04W 72/27 |
| 2021/0135713 A1* | 5/2021 | Kang | H04W 72/046 |
| 2022/0149928 A1* | 5/2022 | Luo | H04B 7/0874 |

* cited by examiner

VIRTUAL BEAM SWEEPING FOR A PHYSICAL RANDOM ACCESS CHANNEL IN NEW RADIO AND LONG TERM EVOLUTION ACTIVE ANTENNA SYSTEMS

CROSS-REFERENCE TO RELATED APPLICATIONS

This application is a Submission Under 35 U.S.C. § 371 for U.S. National Stage Patent Application of International Application Number: PCT/IB2019/053232, filed Apr. 18, 2019 entitled "VIRTUAL BEAM SWEEPING FOR A PHYSICAL RANDOM ACCESS CHANNEL IN NEW RADIO AND LONG TERM EVOLUTION ACTIVE ANTENNA SYSTEMS," the entirety of which is incorporated herein by reference.

TECHNICAL FIELD

This disclosure relates to wireless communication and in particular, to virtual beam sweeping for a physical random access channel (PRACH) in New Radio (NR) and Long Term Evolution (LTE) active antenna systems (AAS).

BACKGROUND

With AAS in LTE and NR, the base station, i.e., eNB/gNB, receiver combines uplink (UL) signals from multiple receive (RX) antennas. For UL common channels such as the physical random access channel (PRACH) and the physical uplink control channel (PUCCH), the eNB/gNB assigns weights to each RX antenna so that the gain/attenuation of the combined signal has certain spatial patterns. An example of such spatial patterns is shown in FIG. 1. In FIG. 1, beams 1 and 5 overlap, beams 2 and 6 overlap, beams 3 and 7 overlap and beams 4 and 8 overlap. The difference between the beams in each pair is the polarization of the beams in the pair. These spatial patterns are the constituent beams that together create the desired shape of the cell coverage.

FIG. 2 is a plot of the effective isotropic sensitivity (EIS) for the horizontal pattern for the combined beams shown in FIG. 1. To ensure ubiquitous service, the cell shape is usually wide in the horizontal plane, sometimes in the vertical plane as well. Although the cell shape is wide, each constituent beam is much narrower. Because they are narrower, the beamforming gain is not strictly equal in all the directions in the cell. This directional inequality causes a ripple effect so that the power of the received signal at the wireless device (WD) may vary by 1-2 dB in different directions. The impact to the PRACH is severe when the channel is close to additive white Gaussian noise (AWGN), e.g., one with a strong line of sight (LOS). An example of the fluctuations in the probability of missed PRACH detection as a function of horizontal angle of arrival shown in FIG. 3.

In Fifth Generation (5G) systems, also referred to as New Radio (NR), the gNB may take advantage of beam management. In particular, the gNB generates much narrower downlink (DL) beams which are only able to cover a small section of the cell. By changing the directions of the beams over time, the gNB sweeps the beams in the entire space of the cell coverage. The WD monitors the beams, selects the desired ones, and reports the information to the gNB. However, this approach is not available for LTE-Advanced.

As a general enhancement, a full interference rejection combining (IRC) receiver can be used to improve signal combining and hence improve PRACH detection and PUCCH decoding.

Using beam management in NR may have some potential challenges:

Because DL channel information will be used in the processing of the UL signal, good channel reciprocity is desirable. Applying this in frequency division duplexing (FDD) can be challenging.

Using beam management has several potential challenges. First, the narrow beams still cause a ripple effect. Without proper processing, performance degradation at a direction between two adjacent beams may be inevitable. Second, for high mobility WDs, it is possible that the desired beam changes during initial attachment of the WD. This may cause problems to both beam determination at the WD and preamble detection at the gNB. Furthermore, because the WD measures and determines beams before transmitting a preamble, beam changes may cause additional delay in the initial attach.

SUMMARY

Some embodiments advantageously provide a method and system for virtual beam sweeping for a physical random access channel in New Radio (NR) and Long Term Evolution (LTE) active antenna systems (AAS).

According to one aspect, a network node, such as a base station, virtually sweeps constituent uplink (UL) common channel beams to reduce directional beam variations for the UL common channels, such as the physical random access channel (PRACH). According to some embodiments, ubiquitous PRACH performance in all directions of cell coverage is achievable. Solutions may not rely on channel reciprocity and do not require or depend upon reported information from the WDs. The entire process may be transparent to the WD, and can be employed in LTE and NR as well as other radio access technologies. Improved performance of the physical uplink control channel (PUCCH) may also be provided.

According to one aspect, a method in a network node for virtual beam sweeping of signals received by antennas of the network node is provided. The method includes determining elements of a beam forming matrix W. The method further includes determining elements of a virtual beam sweeping matrix V, the elements of the virtual beam sweeping matrix V being determined to form beams between beams formed by the beam forming matrix W. The method also includes applying the matrices V and W to uplink signals $S_a$ received by antennas of the network node to produce received signals $S_b$ in a beam space.

According to this aspect, in some embodiments, the application of the virtual beam sweeping matrix V results in a probability of missed signal detection that is lower than a probability of missed signal detection achievable without applying the matrix V. In some embodiments, the method provides a lower probability of missed signal detections for a given probability of false signal detection. In some embodiments, the uplink signals are signals of a physical random access channel, PRACH, or signals of a physical uplink control channel, PUCCH. In some embodiments, a number of beam sweeping steps, v, of the matrix V is based at least in part on an angle θ of separation of beams formed by the matrix W, a step size "z" and a scaling factor "s" according to: v=θ/s/z. In some embodiments, a diagonal element of the matrix V is given by:

$$\exp(j2\pi\Delta_f/n)$$

where $\Delta_f = lu\Phi/v$, $l \in [0, n-1]$, u is an index indicating a given sweeping step, v is a number of beam sweeping steps of the matrix V and where a maximum phase shift $\Phi$ of the signal is given by:

$$\Phi = 2\pi Y \cos(\pi/2 - \theta/s)/\lambda,$$

where Y is a horizontal or vertical separation of antenna elements, $\lambda$ is a wavelength of a carrier frequency, "s" is a scale factor and $\theta$ is an angle of separation between two adjacent beams provided by W. In some embodiments, applying the matrix V and W to uplink signals $S_a$ is according to:

$$S_b(:,:,i) = WV(:,:,i)S_a$$

where, "i" is an index of the direction of a beam formed by the matrix V. In some embodiments, the index "i" is on the interval 0 to v−1 for wideband sweeping, where "v" is a number of beam sweeping steps. In some embodiments, the index "i" is given by i=mod(k, v) for narrowband sweeping, where "v" is a number of beam sweeping steps and "k" is an index indicating a resource element out of N−1 resource elements, where N is a number of preamble symbols of a physical random access channel, PRACH. In some embodiments, dimensions of $S_b$ are (m, N, v), where "m" is a number of uplink beams, "N" is a number of preamble symbols of a physical random access channel, PRACH, and "v" is a number of beam sweeping steps. In some embodiments, dimensions of the matrix V are (n, n, v) where "n" is a number of receive antennas and "v" is a number of beam sweeping steps.

According to another aspect, a network node for virtual beam sweeping is provided. The network node includes processing circuitry configured to determine elements of a beam forming matrix W. The processing circuitry is further configured to determine elements of a virtual beam sweeping matrix V, the elements of the virtual beam sweeping matrix V being determined to form a beam between beams formed by the beam forming matrix W. The processing circuitry is also configured to apply the matrices V and W to uplink signals $S_a$ received by the antennas of the network node to produce received signals $S_b$ in a beam space.

According to this aspect, in some embodiments, the measure of performance is a probability of missed signal detection. In some embodiments, the uplink signals are signals of a physical random access channel, PRACH, or signals of a physical uplink control channel, PUCCH. In some embodiments, a number of beam sweeping steps, v, of the matrix V is based at least in part on an angle $\theta$ of separation of beams formed by the matrix W, a step size "z" and a scaling factor "s" according to: $v = \theta/s/z$. In some embodiments, a diagonal element of the matrix V is given by:

$$\exp(j2\pi\Delta_f/n)$$

where $\Delta_f = lu\Phi/v$, $l \in [0, n-1]$, u is an index indicating a given sweeping step, "v" is a number of beam sweeping steps of the matrix V and where a maximum phase shift $\Phi$ of the signal is given by:

$$\Phi = 2\pi Y \cos(\pi/2 - \theta/s)/\lambda,$$

where Y is a horizontal or vertical separation of antenna elements, $\lambda$ is a wavelength of a carrier frequency, "s" is a scale factor and $\theta$ is an angle of separation between two adjacent beams provided by W. In some embodiments, applying the matrix V and W to uplink signals $S_a$ is according to:

$$S_b(:,:,i) = WV(:,:,i)S_a$$

where, "i" is an index of the direction of a beam formed by the matrix V. In some embodiments, the index "i" is on the interval 0 to v−1 for wideband sweeping, where "v" is a number of beam sweeping steps. In some embodiments, the index "i" is given by i=mod(k, v) for narrowband sweeping, where "v" is a number of beam sweeping steps and "k" is an index indicating a resource element out of N−1 resource elements, where N is a number of preamble symbols of a physical random access channel, PRACH. In some embodiments, dimensions of $S_b$ are (m, N, v), where "m" is a number of uplink beams, "N" is a number of preamble symbols of a physical random access channel, PRACH, and "v" is a number of beam sweeping steps. In some embodiments, dimensions of the matrix V are (n, n, v) where "n" is a number of receive antennas and "v" is a number of beam sweeping steps.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
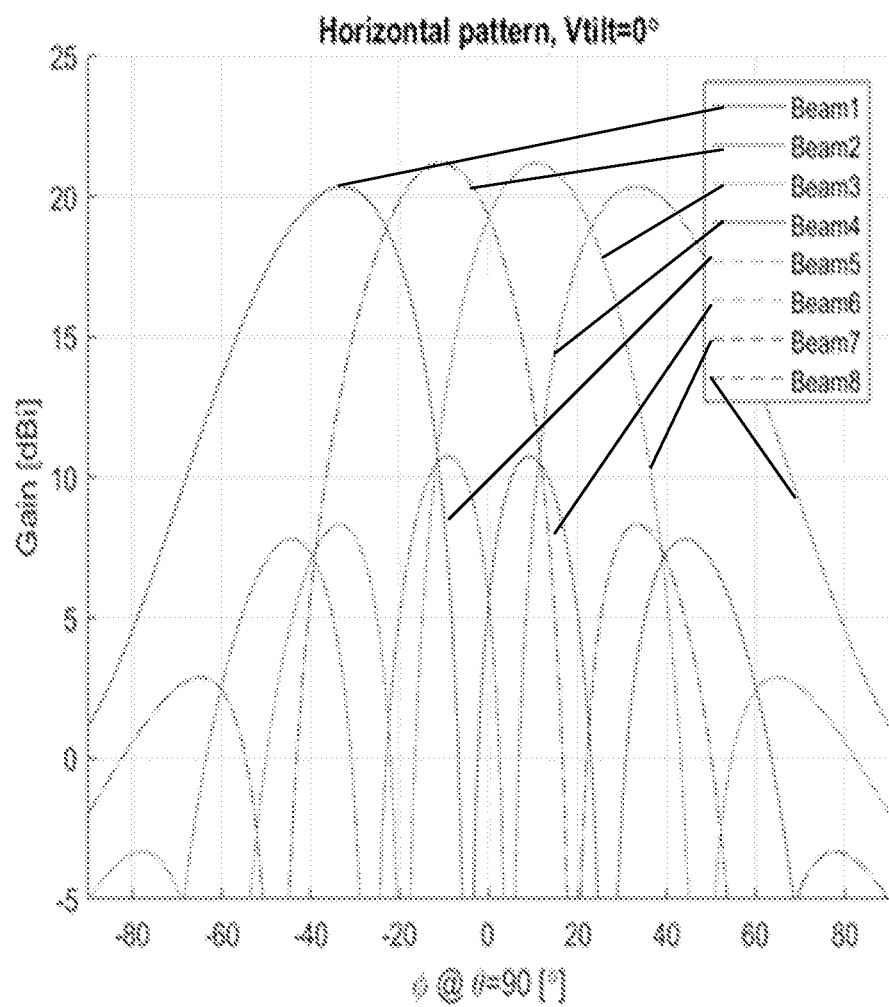
FIG. 1 is a graph illustrating a spatial distribution of constituent beams.
Figure 2:
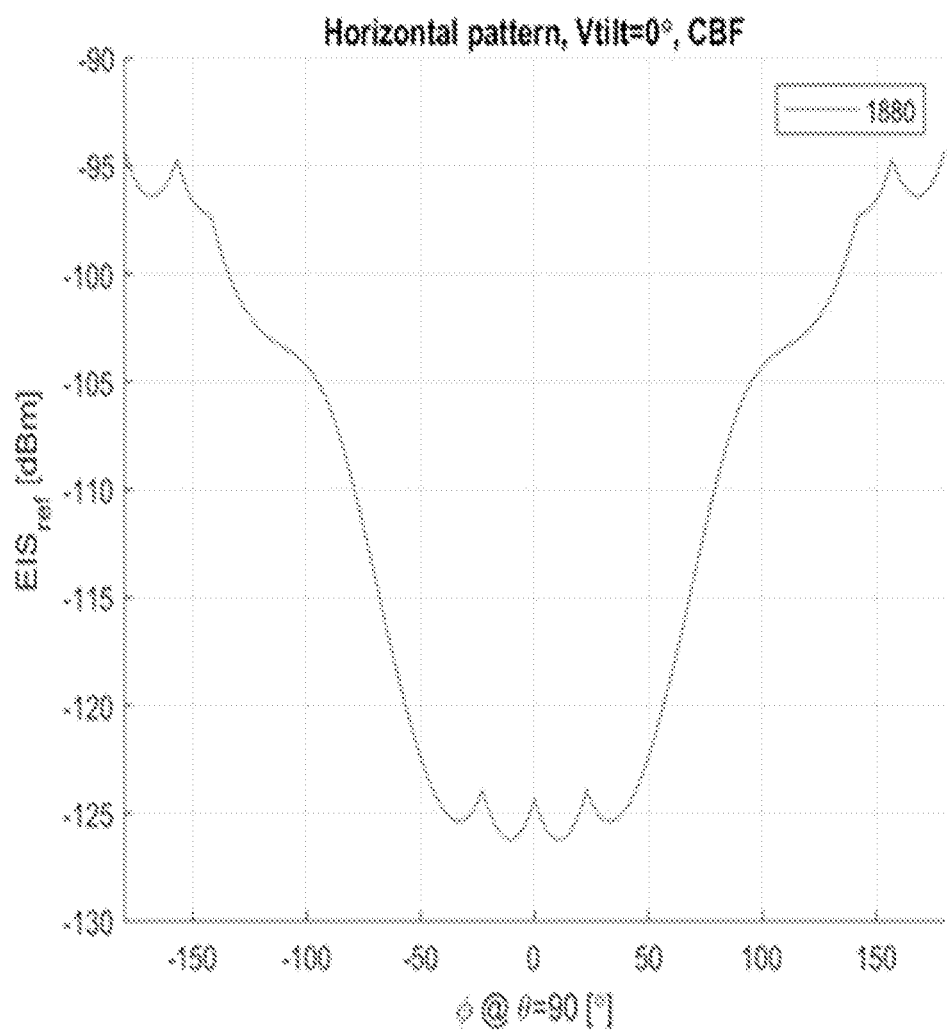
FIG. 2 is a plot of effective isotropic sensitivity (EIS) for the combined beams of FIG. 1.

Before describing in detail exemplary embodiments, it is noted that the embodiments reside primarily in combinations of apparatus components and processing steps related to virtual beam sweeping for a physical random access channel (PRACH) in New Radio (NR) and Long Term Evolution (LTE) active antenna systems (AAS). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein. Some embodiments provide virtual beam sweeping to fill the interstices between uplink beams formed by conventional beam forming. According to some embodiments, a virtual beam sweep matrix, V, is applied to the signals in an antenna space to create beams that overlap to substantially eliminate ripple in the resultant composite of beams. A conventional beam forming matrix, W, may also be applied to the beams resulting from application of the virtual beam sweep matrix.

Alternatively, the matrix W may first be applied to V, which is then applied to the uplink signals received from the wireless devices.

Figure 4:
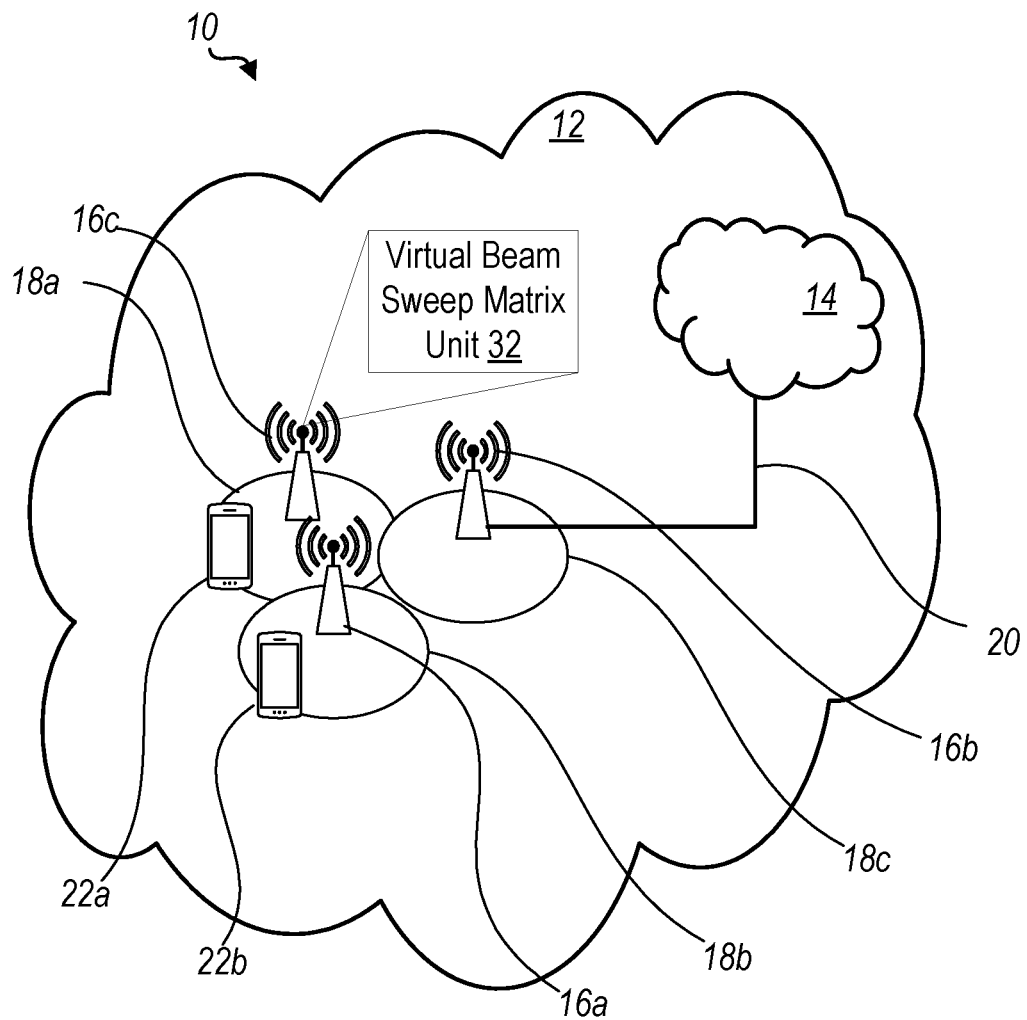
FIG. 4 is a schematic diagram of an exemplary network architecture illustrating a communication system according to the principles of the present disclosure.

Returning now to the drawing figures, in which like elements are referred to by like reference numerals, there is shown in FIG. 4 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN. The network node 16 is configured to include a virtual beam sweep matrix unit 32 which is configured to generate a virtual beam sweep matrix V. The network node is also configured to include a matrix multiplier unit 56 which is configured to apply the virtual beam sweep matrix V and a weight matrix W to uplink signals received from WDs 22.

Example implementations in accordance with an embodiment of the WD 22 and network node 16 discussed in the preceding paragraphs will now be described with reference to FIG. 5. The communication system 10 includes a network node 16 that includes hardware 38 enabling it to communicate with the WD 22. The hardware 38 may include a radio interface 42 for setting up and maintaining at least a wireless connection 46 with a WD 22 located in a coverage area 18 served by the network node 16. The radio interface 42 may be formed as or may include, for example, one or more RF transmitters, one or more RF receivers, and/or one or more RF transceivers.

In the embodiment shown, the hardware 38 of the network node 16 further includes processing circuitry 48. The processing circuitry 48 may include a processor 50 and a memory 52. In particular, in addition to or instead of a processor, such as a central processing unit, and memory, the processing circuitry 48 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 50 may be configured to access (e.g., write to and/or read from) the memory 52, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 44 stored internally in, for example, memory 52, or stored in external memory (e.g., database, storage array, network storage device, etc.) accessible by the network node 16 via an external connection. The software 44 may be executable by the processing circuitry 48. The processing circuitry 48 may be configured to control any of the methods and/or processes described herein and/or to cause such methods, and/or processes to be performed, e.g., by network node 16. Processor 50 corresponds to one or more processors 50 for performing network node 16 functions described herein. The memory 52 is configured to store data, programmatic software code and/or other information described herein. In some embodiments, the software 44 may include instructions that, when executed by the processor 50 and/or processing circuitry 48, causes the processor 50 and/or processing circuitry 48 to perform the processes described herein with respect to network node 16. For example, processing circuitry 48 of the network node 16 may include the virtual beam sweep matrix unit 32 configured to generate the virtual beam sweep matrix V. The processing circuitry 48 may also include matrix multiplier unit 56 configured to multiply the matrices V and W and apply these matrices to received uplink signals.

The communication system 10 further includes the WD 22 already referred to. The WD 22 may have hardware 60 that may include a radio interface 62 configured to set up and maintain a wireless connection 64 with a network node 16 serving a coverage area 18 in which the WD 22 is currently located. The radio interface 62 may be formed as or may include, for example, one or more RF transmitters, one or more RF receivers, and/or one or more RF transceivers.

The hardware 60 of the WD 22 further includes processing circuitry 64. The processing circuitry 64 may include a processor 66 and memory 68. In particular, in addition to or instead of a processor, such as a central processing unit, and memory, the processing circuitry 64 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 66 may be configured to access (e.g., write to and/or read from) memory 68, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 70, which is stored in, for example, memory 68 at the WD 22, or stored in external memory (e.g., database, storage array, network storage device, etc.) accessible by the WD 22. The software 70 may be executable by the processing circuitry 64. The software 70 may include a client application 72. The client application 72 may be operable to provide a service to a human or non-human user via the WD 22.

The processing circuitry 64 may be configured to control any of the methods and/or processes described herein and/or to cause such methods, and/or processes to be performed, e.g., by WD 22. The processor 66 corresponds to one or more processors 66 for performing WD 22 functions described herein. The WD 22 includes memory 68 that is configured to store data, programmatic software code and/or other information described herein. In some embodiments, the software 70 and/or the client application 72 may include instructions that, when executed by the processor 66 and/or processing circuitry 64, causes the processor 66 and/or processing circuitry 64 to perform the processes described herein with respect to WD 22.

Figure 5:
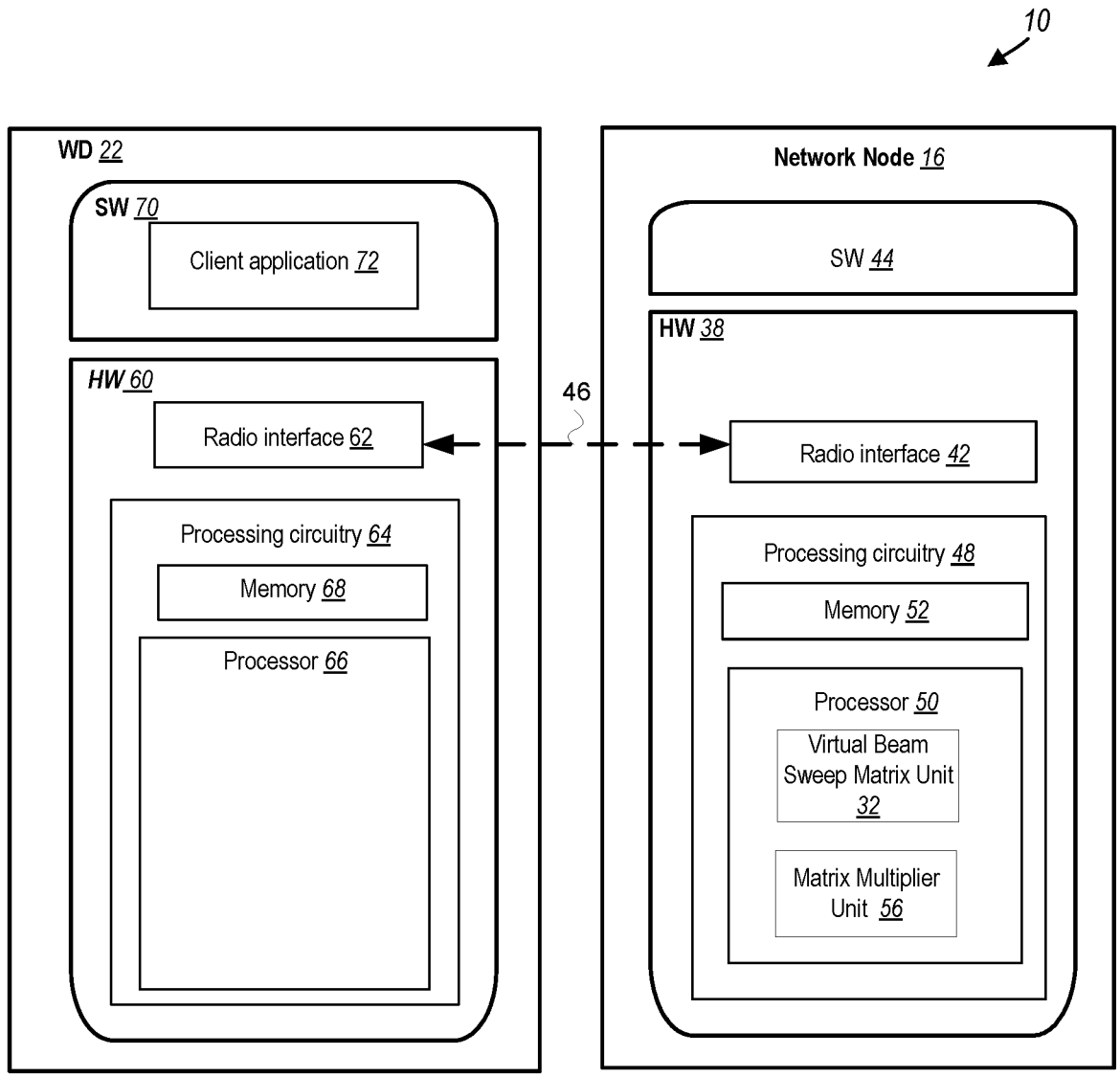
FIG. 5 is a block diagram of a network node in communication with a wireless device over a wireless connection according to some embodiments of the present disclosure.

In some embodiments, the inner workings of the network node 16 and WD 22 may be as shown in FIG. 5 and independently, the surrounding network topology may be that of FIG. 4.

The wireless connection 46 between the WD 22 and the network node 16 is in accordance with the teachings of the embodiments described throughout this disclosure. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve.

Although FIGS. 4 and 5 show various "units" such as virtual beam sweep matrix unit 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 6:
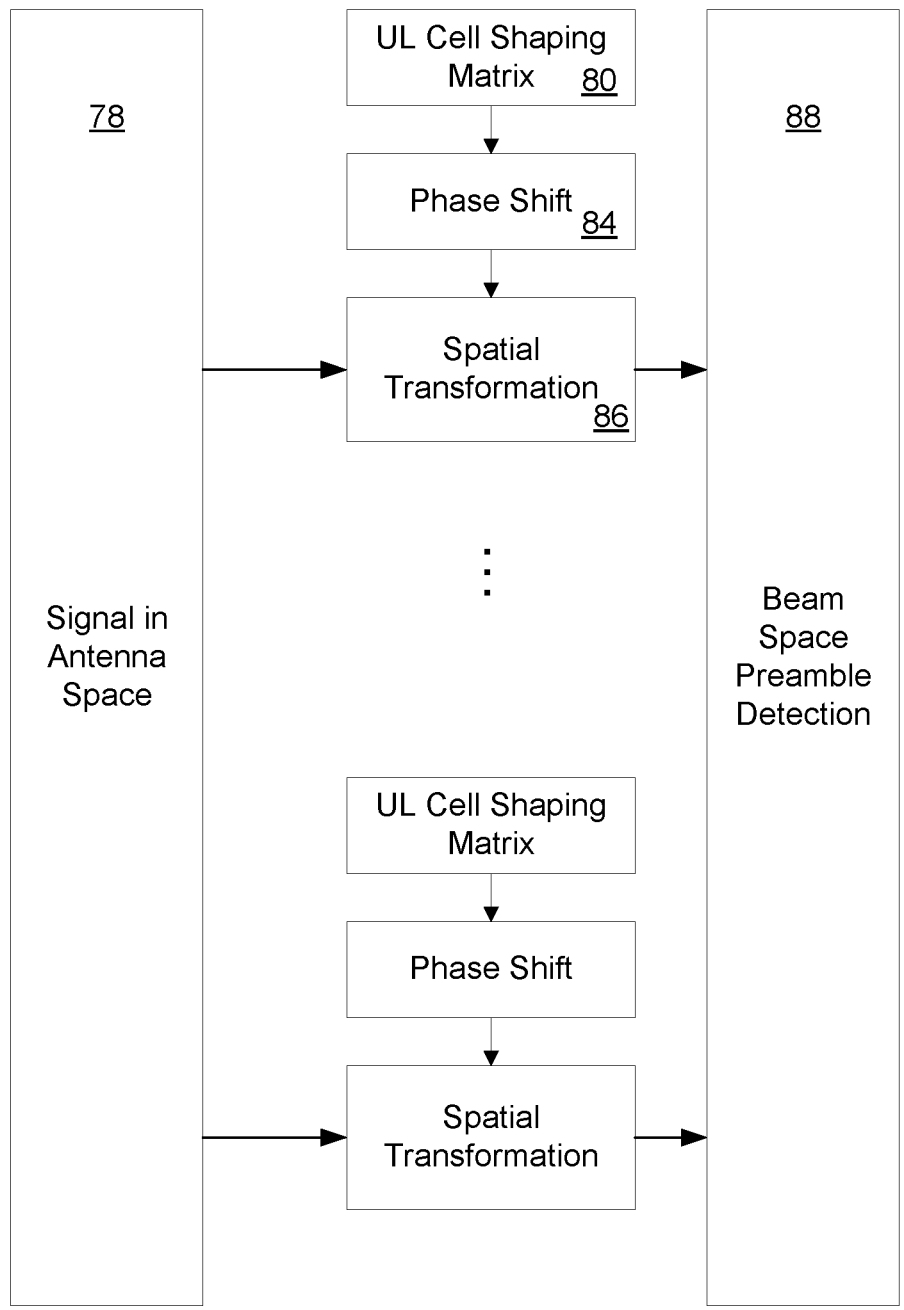
FIG. 6 is a block diagram showing the processing flow for received uplink signals.

FIG. 6 is a block diagram according to some embodiments for application of matrices to achieve beam selection in a network node 16. Block 78 shows that uplink signals from WDs 22 are stored in the memory 52 as a signal in antenna space. Blocks 80, 84 and 86 show that successive matrices are applied to achieve a spatial transformation applied to the signal in antenna space to provide for beam space preamble detection 88. The cell shaping matrix 80 is the weight matrix W. The phase shift matrix 84 is described below as the virtual beam sweeping matrix V. The spatial transformation matrix 86 is the virtual beam sweeping matrix V times the weight matrix W. There is a group of blocks 80, 84 and 86 for each beam formed by the network node 16 for receiving uplink signals.

Figure 7:
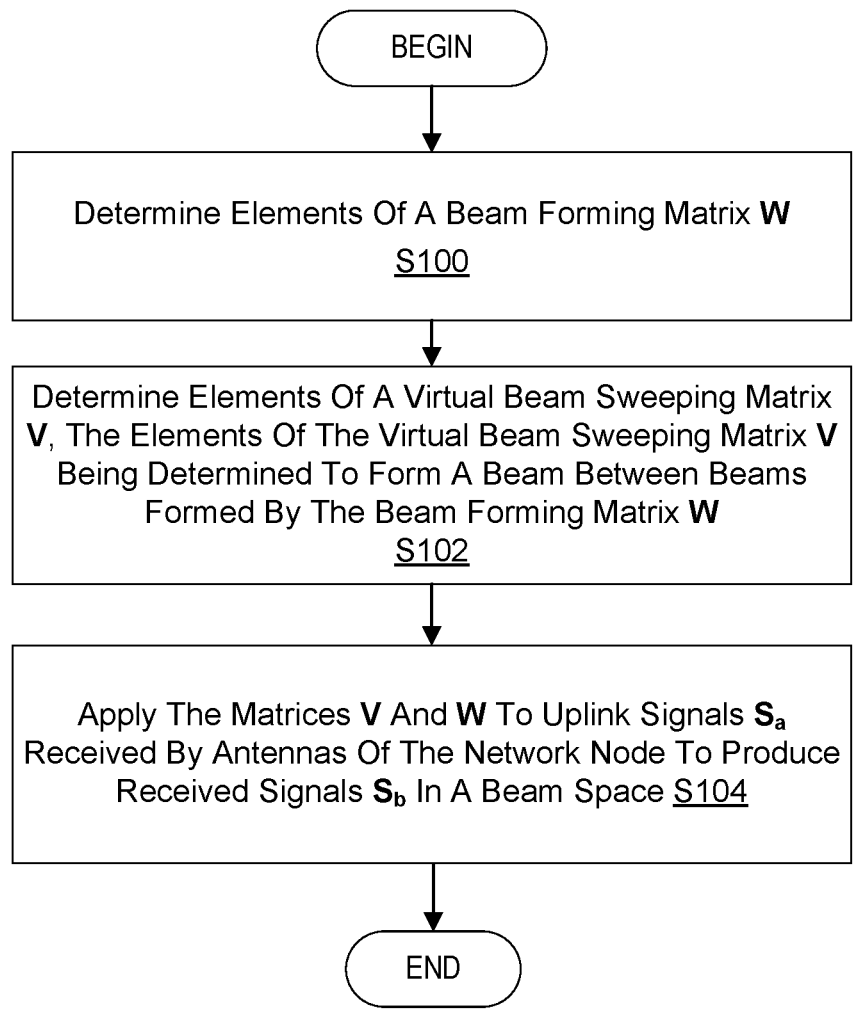
FIG. 7 is a flowchart of an exemplary process in a network node for virtual beam sweeping according to some embodiments of the present disclosure.

FIG. 7 is a flowchart of an exemplary process in a network node 16 for beam forming for a PRACH in NR and LTE active antenna systems in accordance with the principles of the present disclosure. One or more blocks described herein may be performed by one or more elements of network node 16 such as by one or more of processing circuitry 48 (including the virtual beam sweep matrix unit 32), processor 50 and/or radio interface 42. Network node 16 such as via processing circuitry 48 and/or processor 50 and/or radio interface 42 is configured to determine elements of a beam forming matrix W (Block S100). The process further includes determining, via the virtual beam sweep matrix unit 32, elements of a virtual beam sweeping matrix V, the elements of the virtual beam sweeping matrix V being determined to form beams between beams formed by the beam forming matrix W (Block S102). The process also includes applying, via the matrix multiplier unit 56, the matrices V and W to uplink signals $S_a$ received by antennas of the network node to produce received signals $S_b$ in a beam space (Block S104).

Having described the general process flow of arrangements of the disclosure and having provided examples of hardware and software arrangements for implementing the processes and functions of the disclosure, the sections below provide details and examples of arrangements for virtual beam sweeping for a physical random access channel (PRACH) in New Radio (NR) and Long Term Evolution (LTE) active antenna systems (AAS).

Let n be the number of receive (RX) antennas and m be the number of UL beams in a network node 16 (e.g., a base station, eNB/gNB). The number of the PRACH preamble symbols is N. The received signal in the antenna space is described by $S_a$, where the cardinality of $S_a$ is n×N. The received signal in the beam space is described by $S_b$, where the cardinality of $S_b$ is m×N×v, where v is the number of sweeping steps.

In some embodiments, UL common channel beam weights are generated, via the processor 50, using conventional methods. Thus, the network node 16 generates weights matrix W, also referred to herein as a beam forming matrix or UL cell shaping matrix, where the cardinality of W is m×n. W may be a conventional beam forming matrix as used in known systems. The beam forming matrix W forms the beams of the uplink signals to steer beams to different WDs 22 or different cell areas. Then, a sweeping matrix V is generated, via the virtual beam sweeping matrix unit 32, where the cardinality of V is n×n×v. For each value in the third dimension v, the sweeping matrix is an n×n diagonal matrix. The sweeping vector is made of the n×n diagonal elements. The sweeping matrix V is determined to form beams in the interstices between beams formed by the beam forming matrix W.

The value of v is determined, via the processor 50, by the angle separation of the beams, θ, and the step size, z, of sweeping, where v=θ/s/z. The division by s provides the range of the sweeping in terms of the portion of the angle separation of the adjacent beams in W., e.g., s=2 means sweeping to the middle of the angle separation between the two adjacent beams. The value of the diagonal element (l,l, u) in V is $\exp(j2\pi\Delta_l/n)$, where $\Delta_l = lu\Phi/v$, $l\epsilon[0, n-1]$, and the maximum phase shift $\Phi$ of the signal is given by:

$\Phi = 2\pi Y \cos(\pi/2\theta/s)/\lambda$, where Y is the horizontal or vertical separation of the antenna elements, λ is the wavelength of the carrier frequency and θ is the angle of separation between the two adjacent beams provided by W.

Virtual Beam Sweeping

For wideband sweeping and combining, determination of the beams space signal sets may be established according to the following equation:

$S_b(:,:,i) = WV(:,:,i)S_a, i\epsilon[0,v-1]$ where, i is the index of the beam direction. If each constituent beam has a unique direction, i is the index of the beam. If multiple constituent beams have one unique direction, i is the index of the direction that includes multiple beams. In some embodiments, V is applied, via matrix multiplier unit 56, to $S_a$ followed by application, via the matrix multiplier unit 56, of W. Alternatively, in some embodiments, W is applied to V followed by application to $S_a$.

Signal combining may include traditional non-coherent combining. The network node 16 may select the beam or set of beams with the strongest power to compare with a proper threshold to avoid misdetection. Sweeping and combining may be performed over v×m directions. For example, if m=8 and v=4, then there are 32 beams, which may be combined at one time, and the strongest beam can be selected.

For narrowband sweeping and combining, determination of the beam space signals may be established according to the following equation, for each preamble resource element, $RE_k$, $\epsilon[0, N-1]$:

$S_b(:,:,i) = WV(:,:,i)S_a(:,k), i = \text{mod}(k,v)$

Signal combining may include traditional non-coherent combining. The network node 16 may select the beam or beam pair with the strongest power to compare with the proper threshold. Sweeping and combining may be performed over m directions. However, each combining is over v directions. Thus, for example, if v=4 and m=8, the strongest signal may be picked for each of four groups of 8 beams.

Note that wideband sweeping is described above. Narrowband sweeping is similar, a difference being that in narrowband sweeping the phase shift is applied per resource element (RE). For example, one direction of V can be applied to a plurality of antenna signals on one RE, a next direction of V can be applied to the plurality of antenna signals on a next RE, and so on. This may provide an averaging over all the sweeping directions defined by V.

Figure 3:
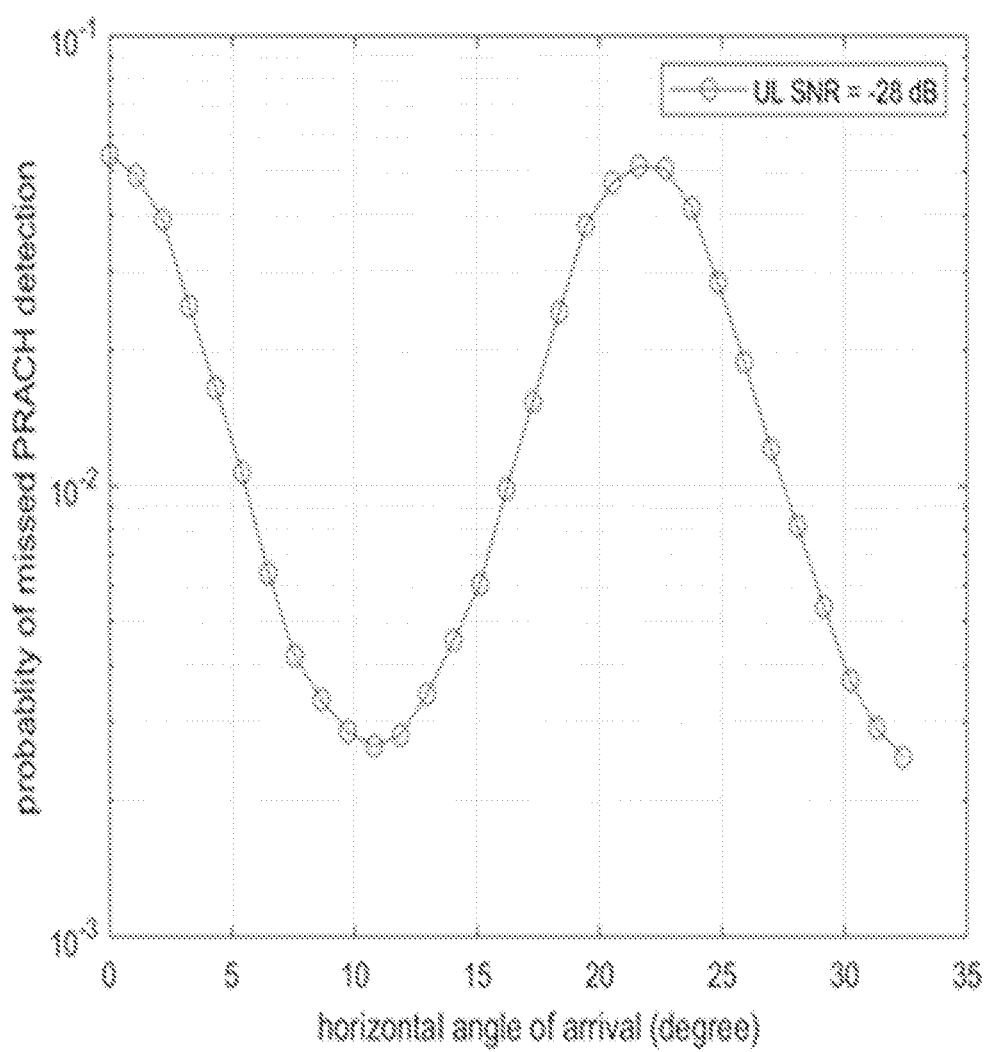
FIG. 3 is a plot of a probability of missed physical random access channel (PRACH) detection resulting from the application of known beam forming techniques.
Figure 8:
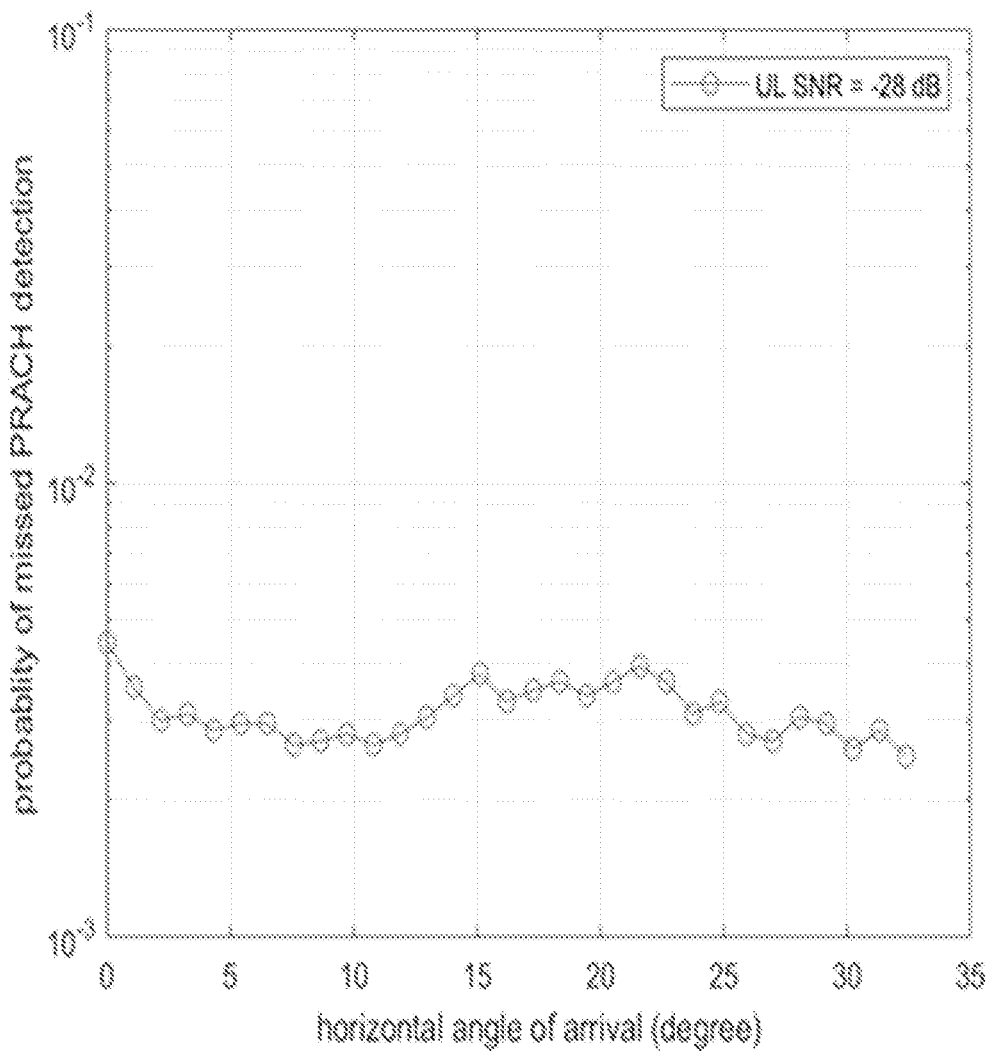
FIG. 8 is a graph of one example of a probability of missed PRACH detection achieved by implementing virtual beam sweeping as disclosed herein.

Expected PRACH performance improvement using wideband sweeping with 8 sweeping steps from −π/2 to +π/2 based on link level simulation with an AWGN channel is shown in FIG. 8 as compared to FIG. 3, for example. The improvement may be at the cost of providing 8 parallel PRACH processing chains. The performance of narrowband sweeping is expected to be slightly worse than wideband sweeping. But there may be only 1 PRACH signal processing chain for narrowband sweeping.

Thus, according to one aspect, a method in a network node 16 for virtual beam sweeping of signals received by antennas of the network node 16 is provided. The method includes determining, via the processor 50, elements of a beam forming matrix W. The method further includes determining, via the virtual beam sweep matrix unit 32, elements of a virtual beam sweeping matrix V, the elements of the virtual beam sweeping matrix V being determined to form beams between beams formed by the beam forming matrix W. The method also includes applying the matrices V and W to uplink signals $S_a$ received by antennas of the network node 16 to produce received signals $S_b$ in a beam space.

According to this aspect, in some embodiments, the application of the virtual beam sweeping matrix V results in a probability of missed signal detection that is lower than a probability of missed signal detection achievable without applying the matrix V. In some embodiments, the method provides a lower probability of missed signal detections for a given probability of false signal detection. In some embodiments, the uplink signals are signals of a physical random access channel, PRACH, or signals of a physical uplink control channel, PUCCH. In some embodiments, a number of beam sweeping steps, v, of the matrix V is based at least in part on an angle θ of separation of beams formed by the matrix W, a step size "z" and a scaling factor "s" according to: v=θ/s/z. In some embodiments, a diagonal element of the matrix V is given by:

$$\exp(j2\pi\Delta_f/n)$$

where $\Delta_f=lu\Phi/v$, $1\epsilon[0, n-1]$, u is an index indicating a given sweeping step, v is a number of beam sweeping steps of the matrix V and where a maximum phase shift Φ of the signal is given by:

$$\Phi=2\pi Y \cos(\pi/2-\theta/s)/\lambda,$$

where Y is a horizontal or vertical separation of antenna elements, λ is a wavelength of a carrier frequency, "s" is a scale factor and θ is an angle of separation between two adjacent beams provided by W. In some embodiments, applying the matrix V and W to uplink signals $S_a$ is according to:

$$S_b(:,:,i)=WV(:,:,i)S_a$$

where, "i" is an index of the direction of a beam formed by the matrix V. In some embodiments, the index "i" is on the interval 0 to v−1 for wideband sweeping, where "v" is a number of beam sweeping steps. In some embodiments, the index "i" is given by i=mod(k, v) for narrowband sweeping, where "v" is a number of beam sweeping steps and "k" is an index indicating a resource element out of N−1 resource elements, where N is a number of preamble symbols of a physical random access channel, PRACH. In some embodiments, dimensions of $S_b$ are (m, N, v), where "m" is a number of uplink beams, "N" is a number of preamble symbols of a physical random access channel, PRACH, and "v" is a number of beam sweeping steps. In some embodiments, dimensions of the matrix V are (n, n, v) where "n" is a number of receive antennas and "v" is a number of beam sweeping steps.

According to another aspect, a network node 16 for virtual beam sweeping is provided. The network node 16 includes processing circuitry 48 configured to determine elements of a beam forming matrix W. The processing circuitry 48 is further configured to determine, via the virtual beam sweep matrix unit 32, elements of a virtual beam sweeping matrix V, the elements of the virtual beam sweeping matrix V being determined to form a beam between beams formed by the beam forming matrix W. The processing circuitry 48 is also configured to apply the matrices V and W to uplink signals $S_a$ received by the antennas of the network node 16 to produce received signals $S_b$ in a beam space.

According to this aspect, in some embodiments, the measure of performance is a probability of missed signal detection. In some embodiments, the uplink signals are signals of a physical random access channel, PRACH, or signals of a physical uplink control channel, PUCCH. In some embodiments, a number of beam sweeping steps, v, of the matrix V is based at least in part on an angle θ of separation of beams formed by the matrix W, a step size "z" and a scaling factor "s" according to: v=θ/s/z. In some embodiments, a diagonal element of the matrix V is given by:

$$\exp(j2\pi\Delta_f/n)$$

where $\Delta_f=lu\Phi/v$, $1\epsilon[0, n-1]$, u is an index indicating a given sweeping step, "v" is a number of beam sweeping steps of the matrix V and where a maximum phase shift Φ of the signal is given by:

$$\Phi=2\pi Y \cos(\pi/2-\theta/s)/\lambda,$$

where Y is a horizontal or vertical separation of antenna elements, λ is a wavelength of a carrier frequency, "s" is a scale factor and θ is an angle of separation between two adjacent beams provided by W. In some embodiments, applying the matrix V and W to uplink signals $S_a$ is according to:

$$S_b(:,:,i)=WV(:,:,i)S_a$$

where, "i" is an index of the direction of a beam formed by the matrix V. In some embodiments, the index "i" is on the interval 0 to v−1 for wideband sweeping, where "v" is a number of beam sweeping steps. In some embodiments, the index "i" is given by i=mod(k, v) for narrowband sweeping, where "v" is a number of beam sweeping steps and "k" is an index indicating a resource element out of N−1 resource elements, where N is a number of preamble symbols of a physical random access channel, PRACH. In some embodiments, dimensions of $S_b$ are (m, N, v), where "m" is a number of uplink beams, "N" is a number of preamble symbols of a physical random access channel, PRACH, and "v" is a number of beam sweeping steps. In some embodiments, dimensions of the matrix V are (n, n, v) where "n" is a number of receive antennas and "v" is a number of beam sweeping steps.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Some abbreviation used herein are explained as follows:

| Abbreviation | Explanation |
| --- | --- |
| EIS | Equivalent Isotropic Sensitivity |
| PRACH | Physical Random Access Channel |
| LTE | Long Term Evolution |
| NR | Next-generation Radio |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a network node for virtual beam sweeping of signals received by antennas of the network node, the method comprising:
   determining elements of a beam forming matrix W;
   determining elements of a virtual beam sweeping matrix V, the elements of the virtual beam sweeping matrix V being determined to form beams between beams formed by the beam forming matrix W; and
   applying the matrices V and W to uplink signals $S_a$ received by antennas of the network node to produce received signals $S_b$ in a beam space, applying the matrix V and W to uplink signals $S_a$ being according to:

$$S_b(:,:,i) = WV(:,:,i)S_a$$

where, "i" is an index of the direction of a beam formed by the matrix V.

2. The method of claim 1, wherein the application of the virtual beam sweeping matrix V results in a probability of missed signal detection that is lower than a probability of missed signal detection achievable without applying the matrix V.

3. The method of claim 1, wherein the uplink signals are one of signals of a physical random access channel (PRACH) and signals of a physical uplink control channel (PUCCH).

4. The method of claim 1, wherein a number of beam sweeping steps, v, of the matrix V is based at least in part on an angle θ of separation of beams formed by the matrix W, a step size "z" and a scaling factor "s" according to:

$$v = \theta/s/z.$$

5. The method of claim 1, wherein a diagonal element of the matrix V is given by:

$$\exp(j2\pi\Delta_f/n)$$

where $\Delta_f = lu\Phi/v$, $l \in [0, n-1]$, u is an index indicating a given sweeping step, v is a number of beam sweeping steps of the matrix V and where a maximum phase shift Φ of the signal is given by:

$$\Phi = 2\pi Y \cos(-\pi/2 - \theta/s)/\lambda,$$

where Y is one of a horizontal and a vertical separation of antenna elements, λ is a wavelength of a carrier frequency, "s" is a scale factor and θ is an angle of separation between two adjacent beams provided by W.

6. The method of claim 1, wherein the index "i" is on the interval 0 to v−1 for wideband sweeping, where "v" is a number of beam sweeping steps.

7. The method of claim 1, wherein the index "i" is given by i=mod(k, v) for narrowband sweeping, where "v" is a number of beam sweeping steps and "k" is an index indicating a resource element out of N−1 resource elements, where N is a number of preamble symbols of a physical random access channel (PRACH).

8. The method of claim 1, wherein dimensions of $S_b$ are (m, N, v), where "m" is a number of uplink beams, "N" is a number of preamble symbols of a physical random access channel (PRACH) and "v" is a number of beam sweeping steps.

9. The method of claim 1, wherein dimensions of the matrix V are (n, n, v) where "n" is a number of receive antennas and "v" is a number of beam sweeping steps.

10. A network node for virtual beam sweeping, the network node comprising antennas and processing circuitry, the processing circuitry configured to:
   determine elements of a beam forming matrix W;
   determine elements of a virtual beam sweeping matrix V, the elements of the virtual beam sweeping matrix V being determined to form a beam between beams formed by the beam forming matrix W; and
   apply the matrices V and W to uplink signals $S_a$ received by the antennas of the network node to produce received signals $S_b$ in a beam space, applying the matrix V and W to uplink signals $S_a$ being according to:

$S_b(:,:,i) = WV(:,:,i) S_a$ where, "i" is an index of the direction of a beam formed by the matrix V.

11. The network node of claim 10, wherein the processing circuitry is further configured to determine a measure of performance based at least in part on a probability of missed signal detection.

12. The network node of claim 10, wherein the uplink signals are one of signals of a physical random access channel (PRACH) and signals of a physical uplink control channel (PUCCH).

13. The network node of claim 10, wherein a number of beam sweeping steps, v, of the matrix V is based at least in part on an angle θ of separation of beams formed by the matrix W, a step size "z" and a scaling factor "s" according to:

$v = \theta/s/z.$

14. The network node of claim 10, wherein a diagonal element of the matrix V is given by:

$\exp(j2\pi\Delta_f/n)$ where $\Delta_f = lu\Phi/v$, $l \in [0, n-1]$, u is an index indicating a given sweeping step, "v" is a number of beam sweeping steps of the matrix V and where a maximum phase shift $\Phi$ of the signal is given by:

$\Phi = 2\pi Y \cos(\pi/2 - \theta/s)/\lambda,$ where Y is one of a horizontal and a vertical separation of antenna elements, λ is a wavelength of a carrier frequency, "s" is a scale factor and θ is an angle of separation between two adjacent beams provided by W.

15. The network node of claim 10, wherein the index "i" is on the interval 0 to v−1 for wideband sweeping, where "v" is a number of beam sweeping steps.

16. The network node of claim 10, wherein the index "i" is given by i=mod(k, v) for narrowband sweeping, where "v" is a number of beam sweeping steps and "k" is an index indicating a resource element out of N−1 resource elements, where N is a number of preamble symbols of a physical random access channel (PRACH).

17. The network node of claim 10, wherein dimensions of $S_b$ are (m, N, v), where "m" is a number of uplink beams, "N" is a number of preamble symbols of a physical random access channel (PRACH) and "v" is a number of beam sweeping steps.

18. The network node of claim 10, wherein dimensions of the matrix V are (n, n, v) where "n" is a number of receive antennas and "v" is a number of beam sweeping steps.

* * * * *